United States Patent
Heeter

(10) Patent No.: US 12,456,110 B2
(45) Date of Patent: Oct. 28, 2025

(54) METHODS FOR CONDUCTING ELECTRONIC PAYMENT TRANSACTIONS WITH SCANNABLE CODES

(71) Applicant: Thomas W Heeter, Jacksonville, FL (US)

(72) Inventor: Thomas W Heeter, Jacksonville, FL (US)

(*) Notice: Subject to any disclaimer, the term of this patent is extended or adjusted under 35 U.S.C. 154(b) by 386 days.

(21) Appl. No.: 17/991,593

(22) Filed: Nov. 21, 2022

(65) Prior Publication Data

US 2023/0087051 A1 Mar. 23, 2023

Related U.S. Application Data

(60) Division of application No. 16/866,132, filed on May 4, 2020, now Pat. No. 11,507,941, which is a
(Continued)

(51) Int. Cl.
*G06Q 20/00* (2012.01)
*G06K 7/14* (2006.01)
(Continued)

(52) U.S. Cl.
CPC .......... *G06Q 20/353* (2013.01); *G06K 7/1413* (2013.01); *G06Q 20/202* (2013.01);
(Continued)

(58) Field of Classification Search
CPC .......... G06Q 2220/00; G06Q 20/3226; G06Q 20/3276; G06Q 20/341; G06Q 20/346;
(Continued)

(56) References Cited

U.S. PATENT DOCUMENTS

| 7,552,094 B2 * | 6/2009 | Park | G06Q 20/325 |
| | | | 705/65 |
| 2007/0194123 A1 * | 8/2007 | Frantz | G06K 17/0022 |
| | | | 235/462.46 |

(Continued)

FOREIGN PATENT DOCUMENTS

FR 2722665 A1 * 1/1996 ............. G09B 29/04

OTHER PUBLICATIONS

Balaban, Contactless in America—Calling for More Assistance, Cards and Payments 2008 (Year: 2008).*

*Primary Examiner* — Richard C Weisberger
(74) *Attorney, Agent, or Firm* — John R Casperson

(57) ABSTRACT

One embodiment of the invention provides for making electronic payments by scanning a merchant 2D code located near the point of sale with the customer's cell phone and transmitting the code or data embodied by the code to a payment center where the merchant's account can be credited and the customer's account debited without transmitting account information over the airwaves. In another embodiment of the invention, both parties transmit the same randomly generated 2D code or data embodied by the code to the payment center where they are matched to each other and to the buyer and seller to process the transaction. In a further embodiment of the invention, an inked tattoo or barcode marking is employed as a password to authorize access to smartphone applications for example, to make an electronic payment over a threshold amount.

6 Claims, 9 Drawing Sheets

Related U.S. Application Data continuation-in-part of application No. 14/079,402, filed on Nov. 13, 2013, now abandoned, which is a continuation-in-part of application No. PCT/US2011/000855, filed on May 13, 2011.

(51) Int. Cl.
*G06Q 20/20* (2012.01)
*G06Q 20/32* (2012.01)
*G06Q 20/34* (2012.01)
*G06Q 20/38* (2012.01)

(52) U.S. Cl.
CPC ....... *G06Q 20/204* (2013.01); *G06Q 20/3274* (2013.01); *G06Q 20/352* (2013.01); *G06Q 20/383* (2013.01); *G06Q 2220/00* (2013.01)

(58) Field of Classification Search
CPC .............. G06Q 20/202; G06Q 20/204; G06Q 20/3274; G06Q 20/352; G06Q 20/383
See application file for complete search history.

(56) References Cited

U.S. PATENT DOCUMENTS

2016/0161717 A1* 6/2016 Chae ................. G02B 13/0045
 359/713
2017/0161717 A1* 6/2017 Xing ................. G06Q 20/3278

* cited by examiner

METHODS FOR CONDUCTING ELECTRONIC PAYMENT TRANSACTIONS WITH SCANNABLE CODES

TECHNICAL FIELD

The present invention relates to the use of machine-readable codes for the purposes of conducting monetary and credit transactions in a secure manner.

BACKGROUND ART

The disclosure of my earlier patent, U.S. Pat. No. 5,878,155, issued Mar. 2, 1999 is incorporated herein by reference. In U.S. Pat. No. 5,878,155 at column 2, lines 40-42, the possibility employing temporary tattoos for the verification method is disclosed.

In my PCT patent application number PCT/US10/02986 filed Nov. 17, 2010, the disclosure of which is incorporated herein, there is disclosed a further security improvement by employing a series of temporary tattoos, each valid only for a temporary period of time, or, alternatively, a temporary tattoo, label, decal or the like carrying a barcode or the like coupled to an identity confirmation step that employs a buyer's cell phone.

DISCLOSURE OF INVENTION

The first embodiment of the present invention is described as a method for conducting an electronic payment. The method employs a seller bar code encoding information electronically linkable to a seller's account, the seller's account belonging to an intended recipient of the electronic payment. A smart-phone with a camera function is employed by a buyer for capturing an image of the seller bar code. A wireless communication system is employed for transmitting data, including data representative of the seller bar code image, from the camera to a remote payment center. Computer applications are present on the smart-phone and at the remote payment center to enable data transmission over the wireless communication system and to authorize the payment center to transfer funds from a buyer's account, typically belonging to the smart-phone owner, to the seller's account. The method is carried out by providing an image of the bar code at a point of sale for goods or services, capturing or scanning an image of the bar code with the camera function of the smart phone, processing the image with the smart-phone application to form a wirelessly transmittable data file, wirelessly transmitting the data file from the smart-phone to the payment center, wirelessly transmitting a data file representative of a payment amount from the smart-phone to the data center, together or separately with the image data, electronically debiting the buyer's account by the payment amount, electronically crediting the seller's account by the payment amount, and transmitting data representative of the crediting of the seller' s account to at least the seller.

In a preferred first embodiment of the invention, only an identifying barcode for the seller is transmitted over the airwaves, and the seller's account associated with the barcode is preferably configured, for security, only for the acceptance of electronic payments.

The second embodiment of the invention also is described as a method for conducting an electronic payment. The method employs a randomly generated code, preferably in machine readable form as a 2-D barcode. An application and a first hardware set is employed to generate the code and display a two-dimensional barcode image representative of the code, and optionally additional information. An application and a second hardware set including a camera function is employed for capturing the displayed barcode image from the first hardware set. Both hardware sets then transmit data strings representative of the barcode image to a remote payment center. At least one of the data strings further includes payment amount data. An application on a third hardware set at the payment center is provided for associating the first data string and the second data string with each other and authorizing an electronic transfer of funds in the amount of payment between an account associated with the first hardware set and an account associated with the second hardware set. The method is carried out by generating and displaying the barcode image on the first hardware set and transmitting a first data string to the remote payment center. The displayed barcode image is captured, or read, by the second hardware set and the second data string is transmitted to the remote payment center. A data string representative of the amount of payment is also transmitted to the remote payment center. At the remote payment center, the first data string is associated with the second data string and the amount of payment, and the electronic transfer of funds in the amount of payment between the account associated with the first hardware set and the account associated with the second hardware set is authorized.

In a preferred second embodiment of the invention, a further security improvement is provided by employing a single-use barcode generated algorithmically, preferably randomly, by either the buyer's or seller's smart-phone-camera-viewer device. Where the image is generated by the seller's device, the invention can be carried out as above, and the image can further encode the amount of payment. Physically small 2D barcodes can encode hundreds of digits.

The third embodiment is described as a method for password-protecting a smart-phone application where the smart-phone has a camera function. The method is carried by providing a user of the smart phone with an inked two-dimensional barcode mark, and providing selected of the user's smart-phone applications with an unlock application functionally dependent on capturing or reading the image of the two-dimensional barcode mark. The method is carried out by capturing the image of the barcode with the camera function of the smart-phone, and processing the image with the unlock application to access the selected application.

In a preferred third embodiment of the invention, a inked tattoo or barcode marking is employed to authorize access to selected smartphone applications or as an extra security layer for the above methods for payments if they are above a threshold amount.

BEST MODE FOR CARRYING OUT THE INVENTION

Figure 1:
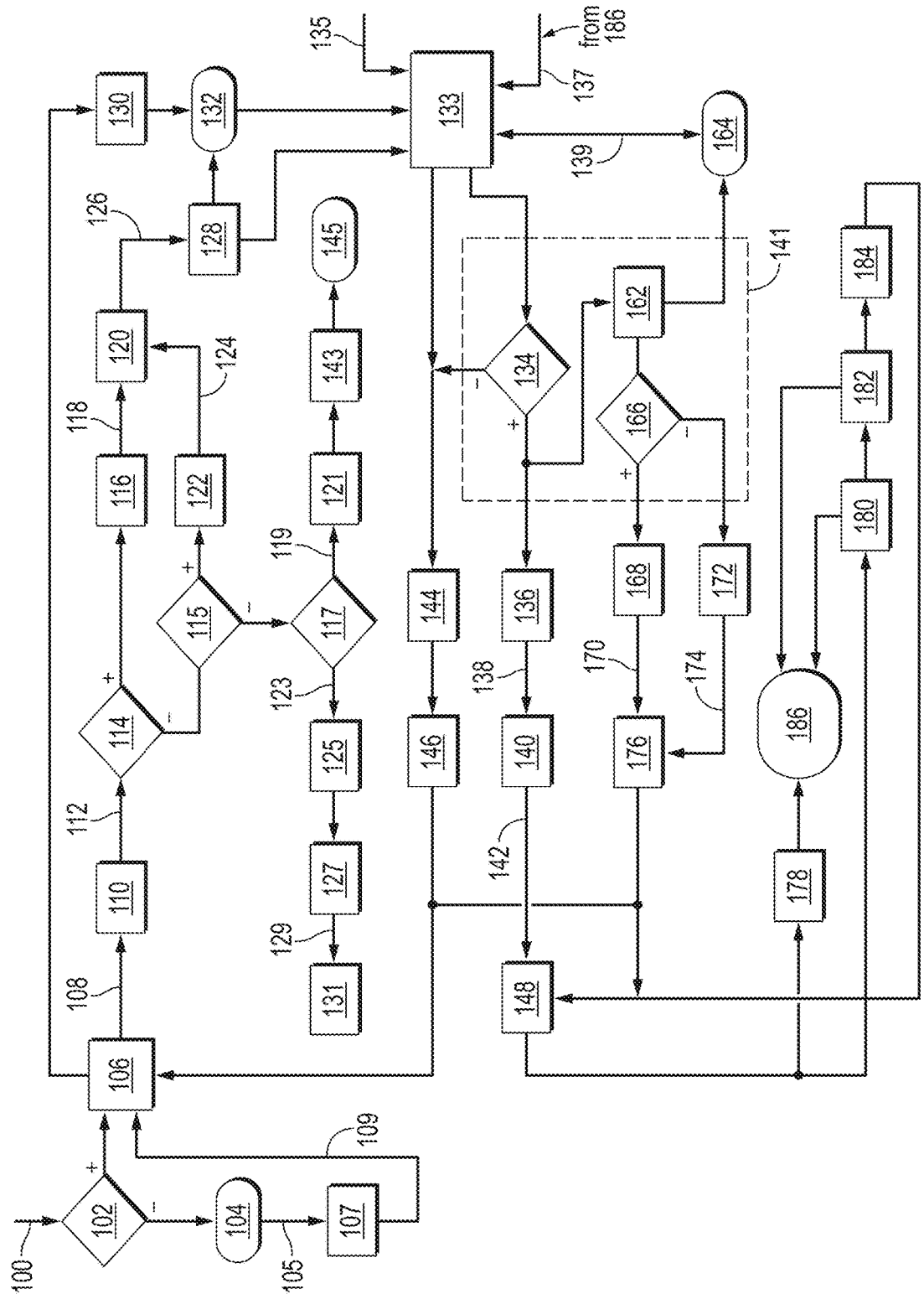
FIG. 1 is a flowchart illustrating a first embodiment of the invention.

The first embodiment of the invention employs a seller bar code encoding information electronically linkable to a seller's account, the seller's account belonging to an intended recipient of the electronic payment. A smart-phone with a camera function is employed for capturing an image of the seller bar code, or reading it. A wireless communication system is employed for transmitting data, including data representative of the seller bar code image, from the camera to a remote payment center. Computer applications are present on the smart-phone and at the remote payment center to enable data transmission over the wireless communication system and to authorize the payment center to transfer funds from a buyer's account, typically belonging to the smart-phone owner, to the seller's account. The method is carried out by providing an image of the bar code at a point of sale for goods or services, capturing an image of the bar code, or reading it, with the camera function of the smart phone, processing the image with the smart-phone application to form a wirelessly transmittable data file, wirelessly transmitting the data file from the smart-phone to the payment center, wirelessly transmitting a data file representative of a payment amount from the smart-phone to the data center, electronically debiting the buyer's account by the payment amount, electronically crediting the seller's account by the payment amount, and transmitting data representative of the crediting of the seller's account to the seller.

The bar code is preferably a two-dimensional bar code. The bar code can further encode a telephone number for establishing contact with the payment center, which the smart phone application reads and dials, or other seller information. The user of the smart-phone can enter, using their keypad, a payment amount which is transmitted to the payment center, and notification of payment can be sent from the payment center to the seller's device at the point of sale. The bar code can be printed on a sign, or it can be electronically generated and displayed on a viewer. Where the code is electronically generated, it can further encode the amount due, which the application on the seller's phone reads and displays, for example, for confirmation by the buyer.

As an example of the first embodiment of the invention, suppose the merchant says the customer owes $25.00. The customer enters $25.00 into their smartphone, scans the merchant's label, and commands send, which (through an application residing in the smartphone), transmits the payment authorization to the payment center, where, contingent on acceptance by the payment center and optionally the merchant, the account associated with the smartphone is debited $25.00 and the account associated with the label is credited $25.00. Notification of the crediting of the merchant account is transmitted to the pay point associated with the merchant's label, where the merchant (and/or customer) can optionally be required to accept the payment, the acceptance being transmitted back to the payment center for the storing of an electronic record of the transaction.

The method takes care of paying the merchant without transmitting customer account information over the airwaves. The merchant account can be made secure by being only configured to accept payments.

The second embodiment of the invention makes use of a randomly generated code. An application and a first hardware set is employed to generate the code and display a two-dimensional barcode image representative of the code. Additional nonrandom information may be encoded as well. An application and a second hardware set including a camera function is employed for capturing or reading the displayed barcode image from the first hardware set. Both hardware sets then transmit data strings representative of the barcode image to a remote payment center. At least one of the data strings further includes payment amount data. An application on a third hardware set at the payment center is provided for associating the first data string and the second data string with each other and authorizing an electronic transfer of funds in the amount of payment between an account associated with the first hardware set and an account associated with the second hardware set. The method is carried out by generating and displaying the barcode image on the first hardware set and transmitting a first data string to the remote payment center. The displayed barcode image is captured or read by the second hardware set and the second data string is transmitted to the remote payment center. A data string representative of the amount of payment is also transmitted to the remote payment center. At the remote payment center, the first data string is associated with the second data string and the amount of payment, and the electronic transfer of funds in the amount of payment between the account associated with the first hardware set and the account associated with the second hardware set is authorized.

The barcode can be generated by either the seller's or the buyer's equipment. Thus, either or both of the first hardware set and the second hardware set can comprise a smartphone. The data string representative of the amount of payment can be transmitted to the remote payment center by either one of the first hardware set and the second hardware set, and the remote payment center can forward the data string representative of the amount of payment to the other of the first hardware set and the second hardware set for confirmation, and the hardware set which receives the forwarded data string can transmit a data string back to the payment center representative of acceptance of the amount.

Figure 2:
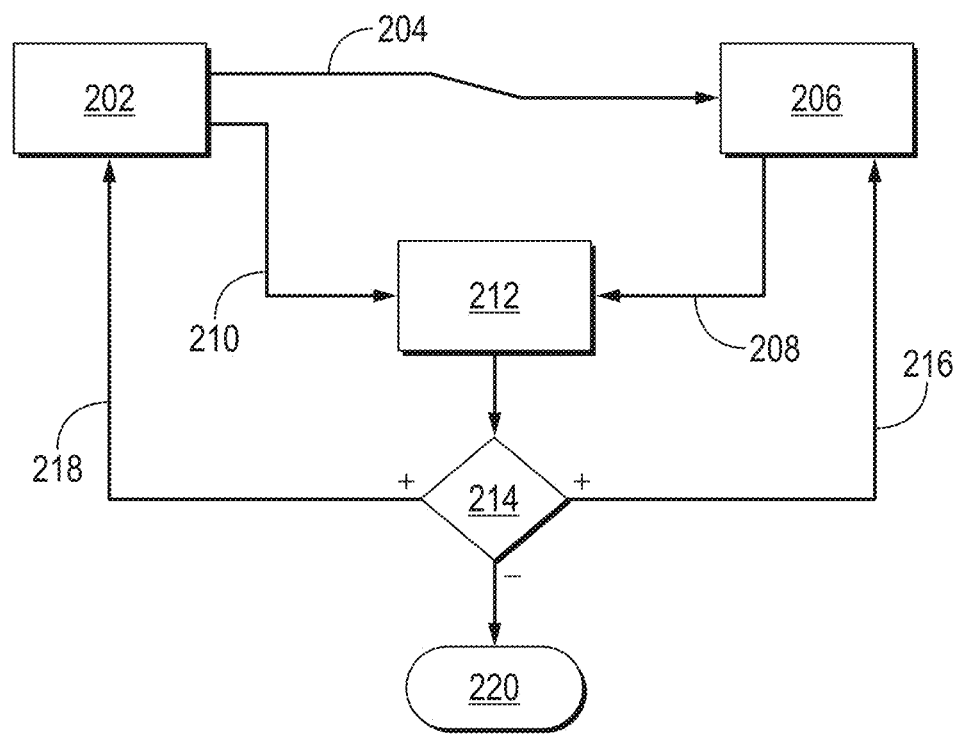
FIG. 2 is a flowchart illustrating a second embodiment of the invention.
Figure 3:
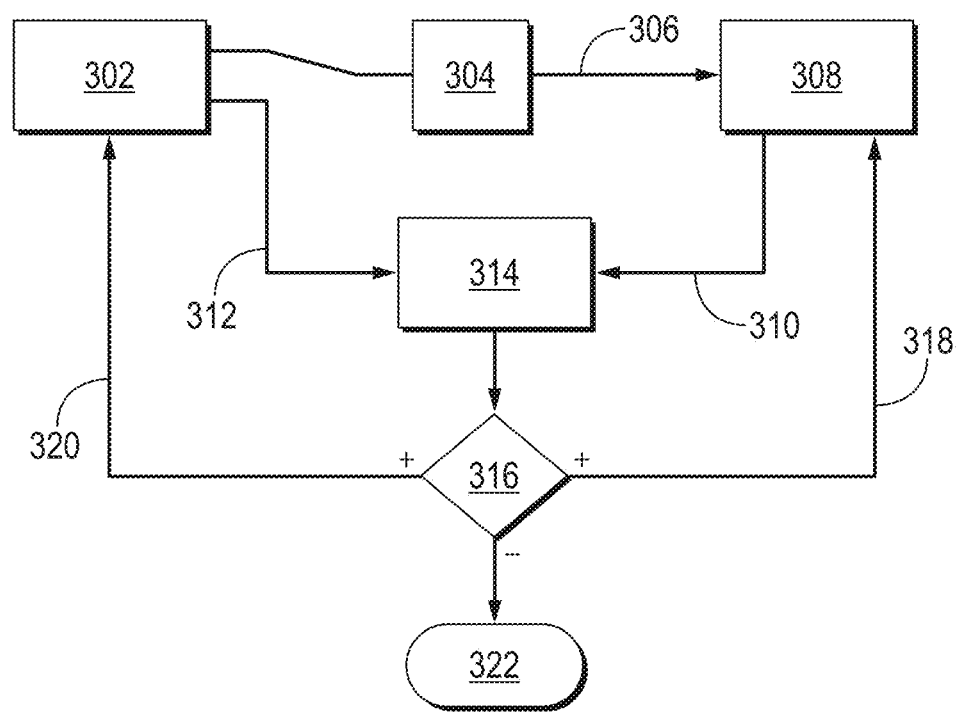
FIG. 3 is a flowchart illustrating another way of carrying out the second embodiment of the invention.
Figure 4:
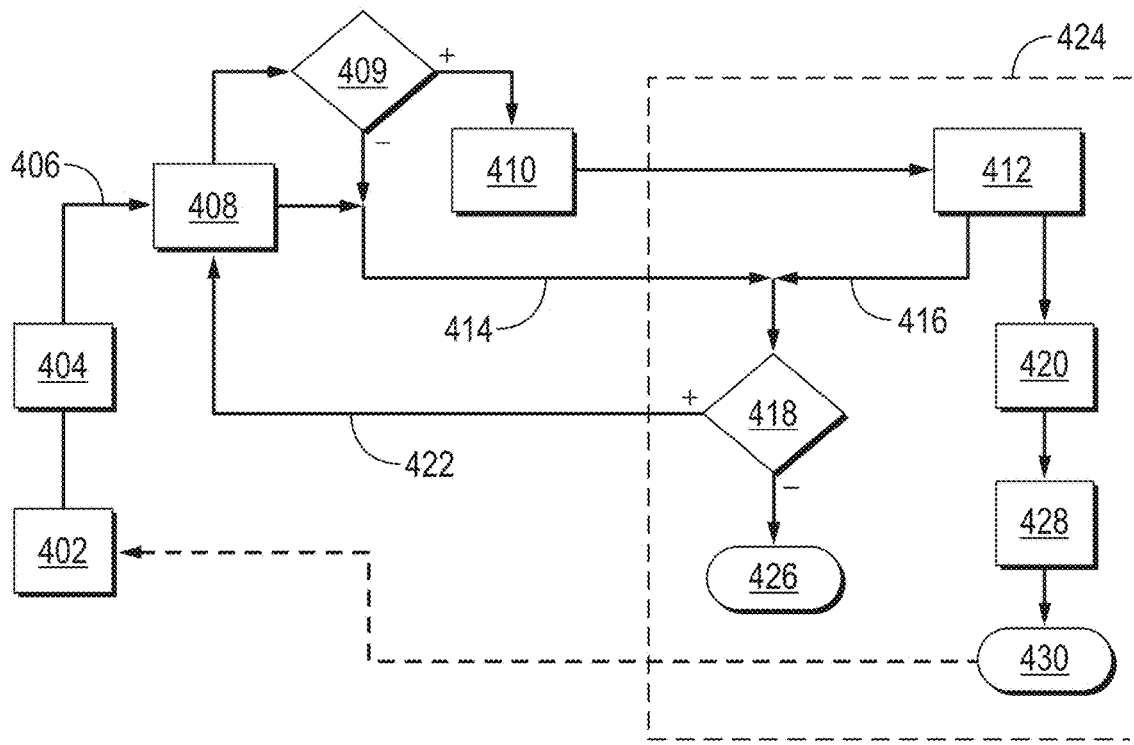
FIG. 4 is a flowchart is a flowchart illustrating a third embodiment of the invention.
Figure 5:
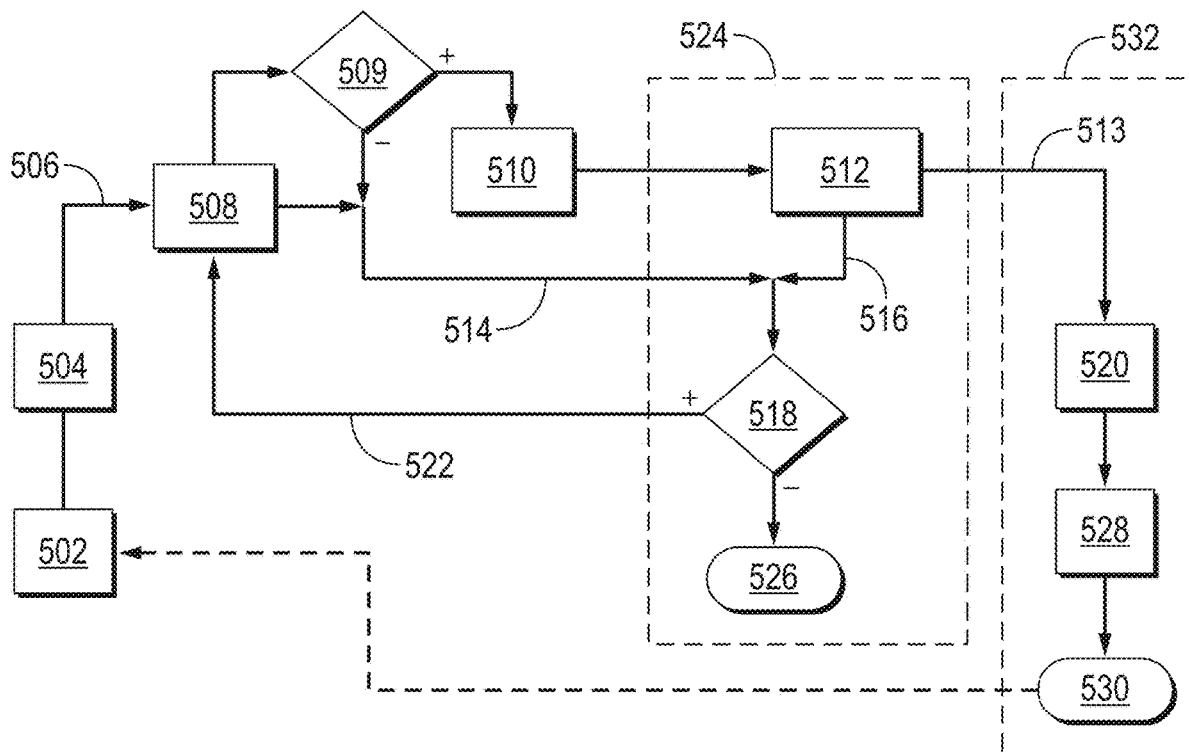
FIG. 5 is a flowchart illustrating further aspects of the third embodiment of the invention.

In a preferred embodiment of the second embodiment of the invention, as illustrated in FIG. 2, the customer's phone dynamically generates a unique 2D Bar Code for transaction and a micromerchant's phone takes a photograph of the 2D bar code image or otherwise decodes the embedded code. After validation, the Payment Center sends a unique generated code for the transaction to both customer and merchant. Alternatively, the second embodiment can be carried out as shown in FIG. 3, where the merchant's phone dynamically generates a unique 2D bar code for the transaction, the customer phone takes a picture (static image) of the 2D barcode or decodes the embedded code, and the payment center receives (along with transaction data) the unique 2D bar code or embedded code.

As an example of a second embodiment of the invention, a customer wanting to pay a merchant commands the production, via an application residing in their smartphone, of a data matrix code image on the viewer of their smartphone. The data matrix code is single-use, at least a portion of the code being randomly generated by the customer's smartphone. The merchant scans the customer's data matrix code image and transmits, via an application residing the merchant hardware, the data matrix code image, the amount of the transaction, and merchant information to the payment center associated with the data matrix code image. The buyer transmits the data matrix code to the payment center, where it is matched up to the merchant transmission, and contingent on the data matrix image being unique, associated with the buyer's account for debiting and the merchant's account for crediting in the amount of the transaction. Notification of the crediting of the merchant account (or rejection of the code) is transmitted to the paypoint associated with the merchant's transmission, and the merchant (and/or customer) can optionally be required, if the transaction is to proceed, to accept the payment, the acceptance being transmitted back to the payment center for the storing of an electronic record of the transaction. Alternatively, the transaction can begin by the merchant generating the data matrix code image containing a portion which is randomly generated and the buyer captures an image of the merchant's code for transmission to the payment center. The transaction then proceeds, mutatis mutandis, through the crediting notification/confirmation steps as above.

In the second embodiment of the invention, the customer's account is protected against unauthorized debiting by a single-use lengthy random code string which must be matched and preferably corroborated in some way in order for the debit to proceed.

The third embodiment of the invention is described as a method for password-protecting a smart-phone application where the smart-phone has a camera function. The method is carried by providing a user of the smart phone with an inked two-dimensional barcode mark, and providing selected of the user's smart-phone applications with an unlock application functionally dependent on scanning or capturing an image of the inked two-dimensional barcode mark. The method is carried out by scanning or capturing an image of the inked barcode with the camera function of the smart-phone, and processing the image with the unlock application to access the selected application.

The smartphone application can be configured to time-out the period during which it will accept a given code. In such case the scanned mark unlocks the application only if the mark is scanned during a predetermined time period. The user would have to change the bar code and reset the application periodically in order to maintain functionality and avoid being locked out of applications on their own phone. The inked two-dimensional bar code could be printed on the skin of the user or on a sticker or label applied to a personal object of the user. One application that would be especially desirable to password protect in the manner of the third embodiment of the invention would be where the smartphone user is attempting to make an electronic payment over a predetermined amount, say over $100. In that case, the financial account of the user would be debited in the amount of the electronic payment only after the printed barcode was scanned.

As an example of a third embodiment of the invention, a smartphone user also carries an image of a data matrix code. The code can be in the form of a sticker that is carried on a card, for example. The user's smartphone is provided with an application that only permits certain applications on the smartphone to be used after the data matrix code is scanned. The application can be used to lock up payment applications, or used to confirmed payments of over a threshold amount.

The Figures show data flow and logic which can be used to carry out preferred embodiments of the invention. Reference numerals used in the Figures are as follows:

100 Do you have SmartPay?
102 Customer has Smartpay?
104 Dial or Text number of Server to Customer phone
105 Customer requests Smartpay Appl by phone
106 Customer (Payment Sender)
107 Telephony server
108 Amount
109 Smartphone application downloaded to Customer phone
110 Mobile Application entering amount
112 Amount
114 Has decal to scan?
115 Receiver has account?
116 Mobile Application Scanning Decal
117 Is Receiver Merchant or other consumer?
118 Decal Information
119 Merchant
120 Mobile Application Sending payment information to Payment Center
121 Send link to Web portal
122 Entering in Receiver's phone #
123 Consumer
124 Mobile phone #
125 Send download link
126 Payment information (first name, email, phone #, merchant phone #, trxn # or other info)
127 Telephony server sends Link
128 Payment Server Checking customer eligibility (e.g. funds)
129 SMS link sent to smartphone
130 Mobile Application Payment Server Creating new Smartpay customer account
131 Customer smartphone
132 SmartPay Customer Account
133 Payment Server
134 Is customer eligible?
135 Customer Data
136 Payment Server sending approval to customer via email and/or SMS Messaging
137 Merchant account data from 186
138 Payment Info
139 Paypal or comparable payment gateway may serve as payment server
140 Mobile Application showing transaction approval (also sent to merchant)
141 Inside payment server
142 Payment information
143 Merchant's desktop, notebook, slate or tablet PC 144 Payment Server Sending Error message to customer via Mobile App
145 Merchant signup
146 Mobile Application Showing transaction failure to customer
148 Merchant (Payment Receiver)
162 Payment Server completes transaction via Paypal or comparable payment gateway
164 Paypal or other comparable payment gateway
166 Did payment gateway successfully fund transaction?
168 Payment server Sending confirmation to customer and Merchant via Text and Email
170 Confirmation
172 Payment Server Sending Transaction failure information to Customer and Merchant
174 Failure information via text and email
176 Mobile App Showing/Notifying Transaction confirmation or Failure
178 Mobile App/Payment Server Creating Smartpay Merchant Account
180 Payment Server Logging into SmartPay Merchant Account
182 Payment Server Generating Decal with Merchant information
184 Payment Server Printing Decal
186 SmartPay Merchant Account
202 Customer's Phone (internally generates dynamic photo code image)
204 click (micro)merchant captures image
206 (Micro)merchant phone
208 (Micro)merchant phone sends static image (or decodes and sends unique value) to
210 Customer phone sends static image to (or decodes and send unique value) to
212 Payment Center
214 Equal?
216 If yes, payment center sends confirmation code or unique value to merchant and customer
218 Generated Confirmation Code
220 Reject transaction
302 Merchant's phone (internally generates dynamic photo code image)
304 Display 2D image by merchant
306 click-customer phone captures merchant image
308 Customer phone
310 Customer phone sends static image (or decodes and sends unique value to)
312 Merchant's phone sends static image (or decodes and sends unique value to)
314 Payment center
316 Static image or digital code embedded processing
318 Confirmation code to customer
320 Confirmation code to merchant
322 Reject transaction
402 wallet card
404 scan
406 digitize
408 Customer phone
409 Generate new code?
410 Customer regenerates new code
412 Smart Lock database stores code
414 input (2D code)
416 Read stored 2D code value from 412
418 Equal?
420 Printer
422 Unlock phone
424 Server
426 Keep locked
428 Sticker for Wallet card
430 transmit to customer
502 Wallet card
504 Scan
506 Digitize
508 Customer Phone
509 Generate new code
510 Customer's phone generates new code
512 Customer's phone internally stores generated code
513 to printer or external center
514 Input 2D bar code
516 Read stored 2D bar code value from 512
518 Equal?
520 printer
522 Unlock phone
524 Inside phone (Steps 516-526)
526 Keep locked
528 Sticker for wallet card
530 Print out locally or Transmit to Customer from Processing Center
532 External printer or processing Center
600 Do you have SmartPay?
602 Customer has Smartpay?
604 Dial or Text number of Server to Customer phone
605 Customer requests Smartpay Appl by phone
606 Customer (Payment Sender)
607 Telephony server
608 Amount
609 Smartphone application downloaded to Customer phone
610 Mobile Application entering amount
612 Amount
614 Receiver has decal to scan
615 Receiver has account?
616 Mobile Application Scanning Decal
617 Is Receiver Merchant or other consumer?
618 Decal Information
619 Merchant
620 Mobile Application Sending payment information to Payment Center
621 Send link to Web portal
622 Entering in receiver's phone #
623 Consumer
624 Mobile phone #
625 Send download link
626 Payment info. (first name, email, phone #, amt, merchant phone #, trxn# or other info)
627 Telephony server sends Link
628 Payment Server Checking customer eligibility (e.g. funds, name, etc)
629 SMS link sent to smartphone
630 Mobile Application Payment Server Creating new Smartpay customer account
631 Customer smartphone
632 SmartPay Customer Account
633 Payment server
634 Is customer eligible?
635 Customer Data
636 Payment Server sending approval to customer via email and/or SMS Messaging
637 Merchant account data from 686
638 Payment Info
639 Paypal or comparable payment gateway may serve as payment server
640 Mobile Application showing transaction approval (also sent to merchant)

Figure 6:
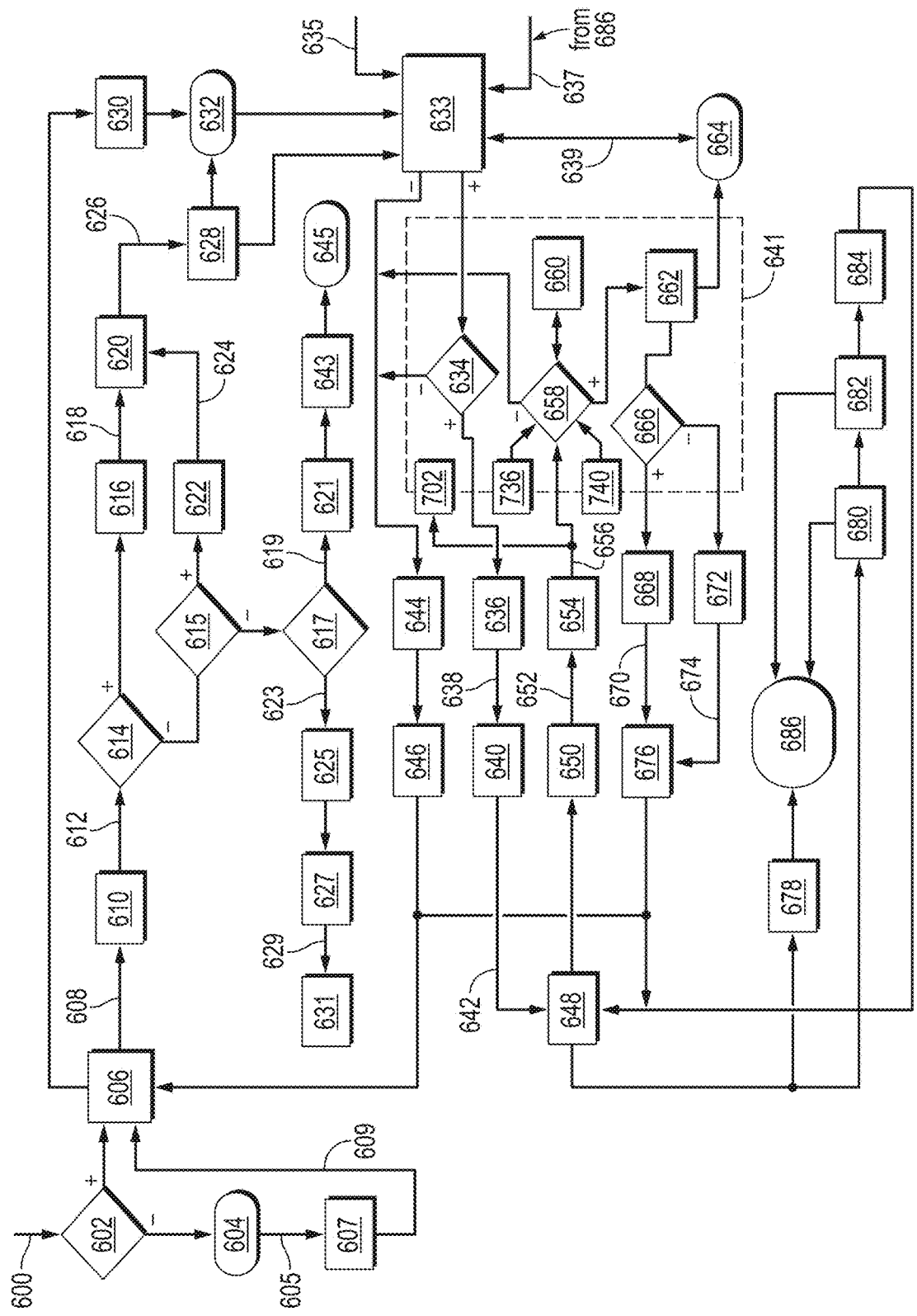
FIG. 6 is a flowchart illustrating further aspects of the first embodiment of the invention.
Figure 7:
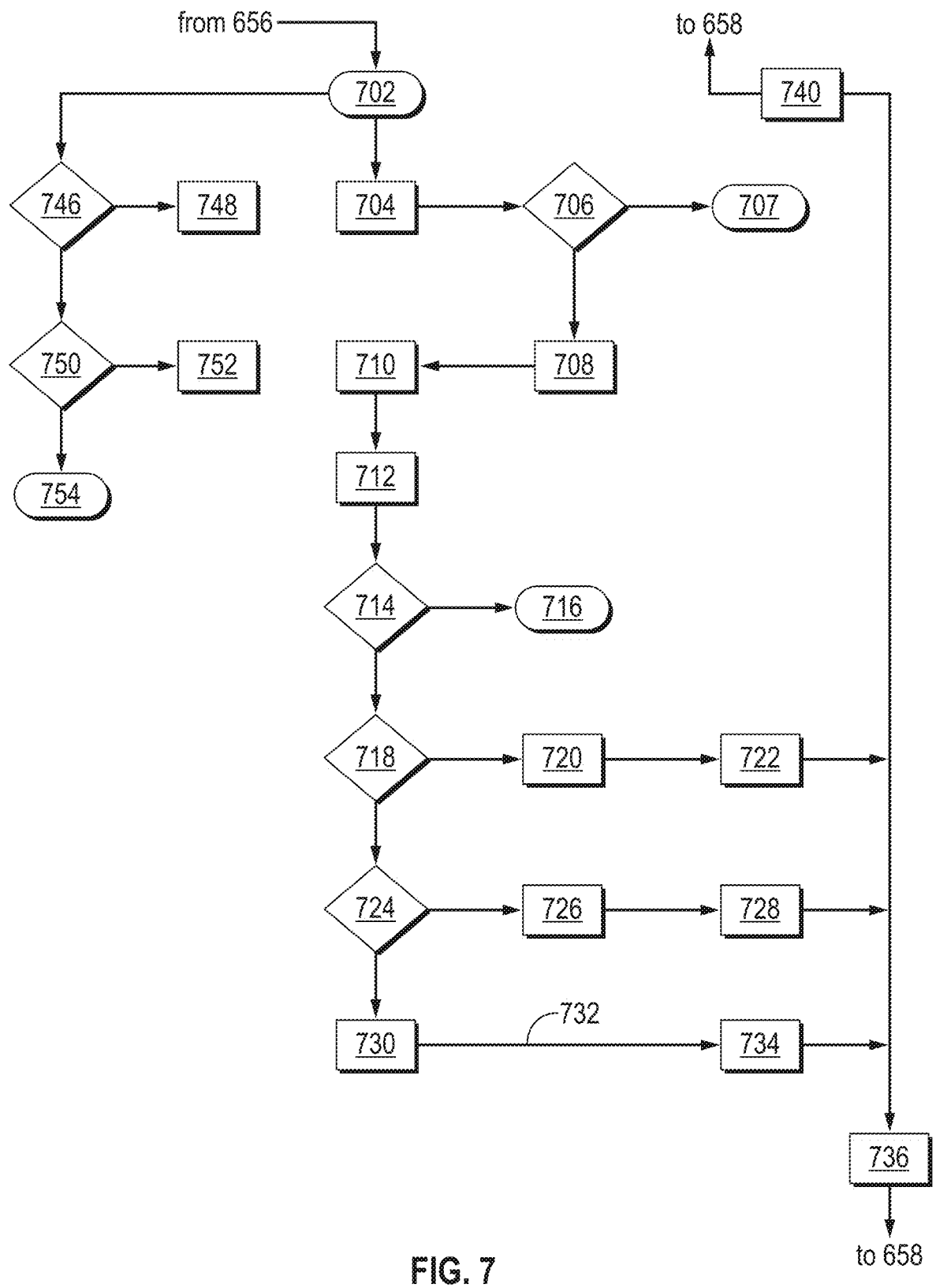
FIG. 7 is a flowchart illustrating further logic for the FIG. 6 flowchart.

641 Inside payment server
642 Payment information
643 Merchant's desktop, notebook, slate or tablet PC
644 Payment Server Sending Error message to customer via Mobile App
645 Merchant signup
646 Mobile Application Showing transaction failure to customer
648 Merchant (Payment Receiver)
650 Mobile Application Receiving Merchant's request for funds
652 Authorize Response
654 Mobile Application Sending Merchant's request for funds
656 Authorize Response
658 Is transfer authorized?
660 Payment server evaluates request
662 Payment Server completes transaction via Paypal (or comparable gateway)
664 Paypal or comparable payment gateway
666 Did payment gateway successfully fund transaction?
668 Payment server Sending confirmation to customer and Merchant via Text and Email
670 Confirmation
672 Payment Server Sending Transaction failure information to Customer and Merchant
674 Failure information via text and email
676 Mobile App Showing/Notifying Transaction confirmation or Failure
678 Mobile App/Payment Server Creating Smartpay Merchant Account
680 Payment Server Logging into SmartPay Merchant Account
682 Payment Server Generating Decal with Merchant information
684 Payment Server Printing Decal
686 SmartPay Merchant Account
702 Customer Smart Phone
704 Display request for payment from merchant
706 Customer selects funding source or exit
707 Exit
708 Customer selects debit, credit, or paypal
710 Customer selects Continue
712 Customer selects Rewards Card
714 Confirms amount?
716 Re-enter or Exit
718 Cash Back?
720 Process cash back if approved (amount entered, confirmation of receipt, inform clerk)
722 To payment server
724 Query change to charity
726 If approved, process charity request ($1.00 less decimal part of bill)
728 To payment server
730 Mobile application scans decal
732 Decal information is transmitted
734 To payment server
736 Confirmation to merchant with cash back amount
740 Customer is given cash back
746 Print receipt?
748 Printer
750 Query whether Seller to be added to contact list
752 Seller added to contact database
754 Exit FIGS. 6 and 7 are connected in that the merchant initiates the request for payment 650-656, which then goes to 702, and after the user/consumer has made choices, the flow goes back to the Payment Server to authorize the transfer (658-660).

Private Radio Transceiver Payment Card Embodiment

Buyer payment configuration (See FIGS. 8-11)

Figure 8A:
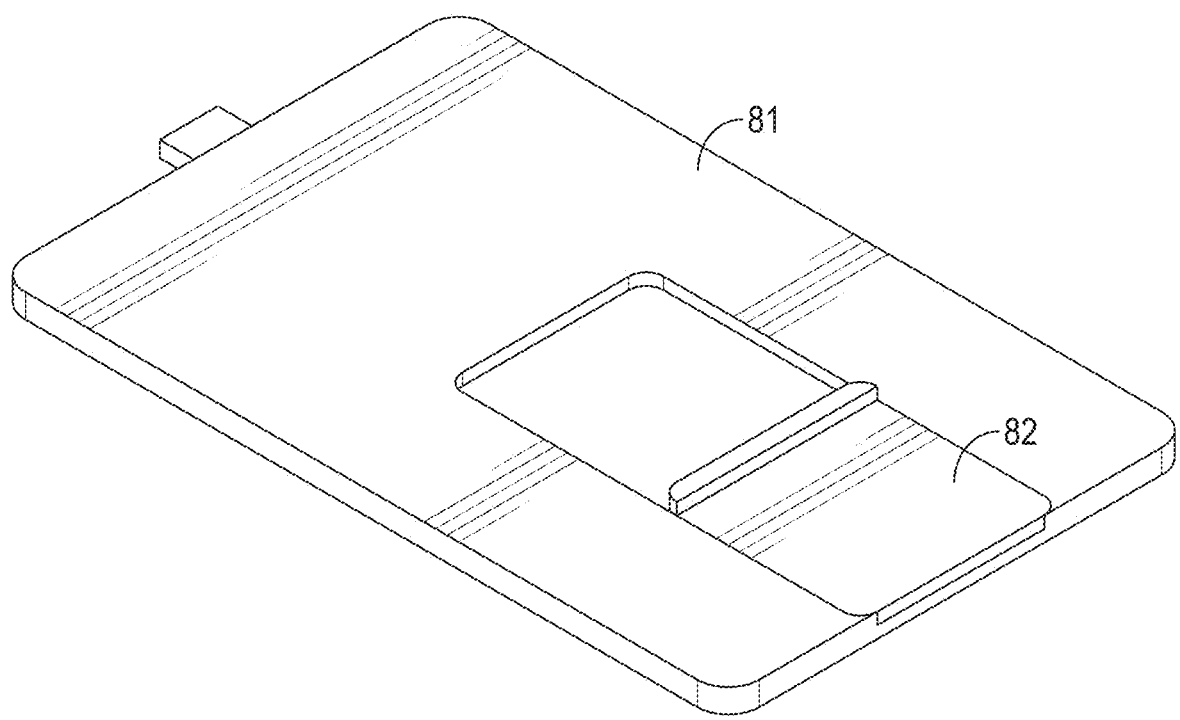
FIGS. 8A and 8B depicts the most basic level functional step of a preferred embodiment of the invention such that the payment card displays a scannable code when the privacy slide is opened when the payment card is inserted into a payment terminal, with the scannable code being linked to the card holder user's identity data.
Figure 8B:
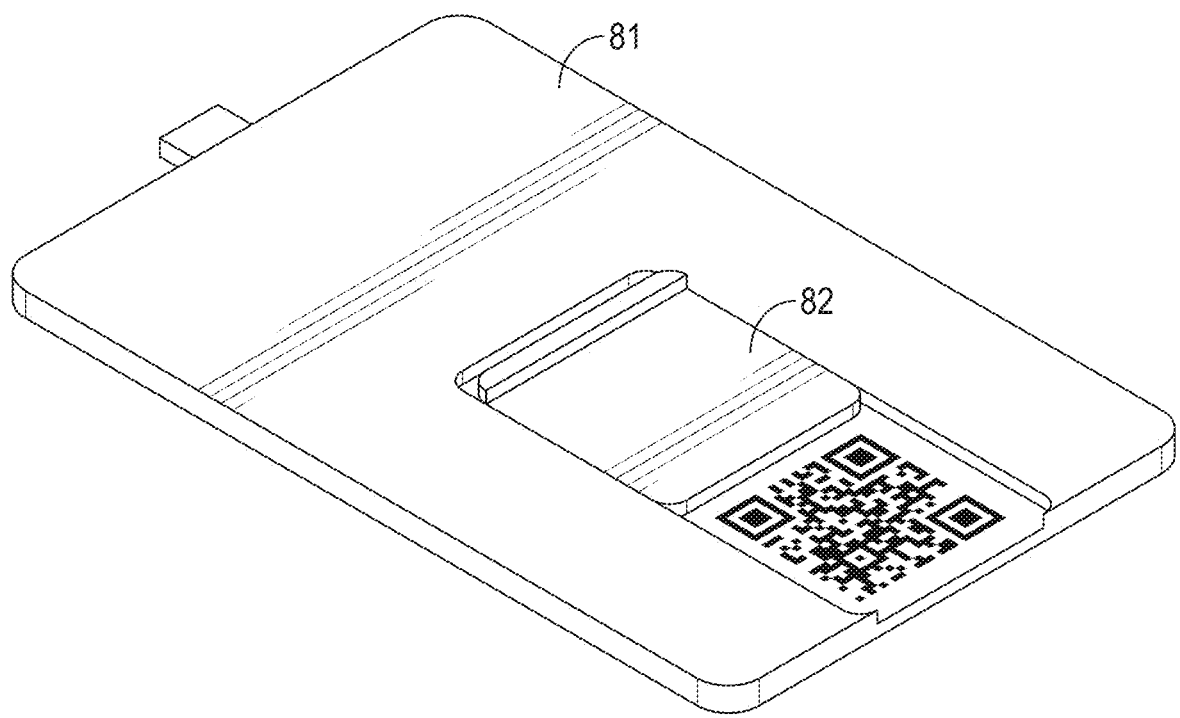
Figure 9:
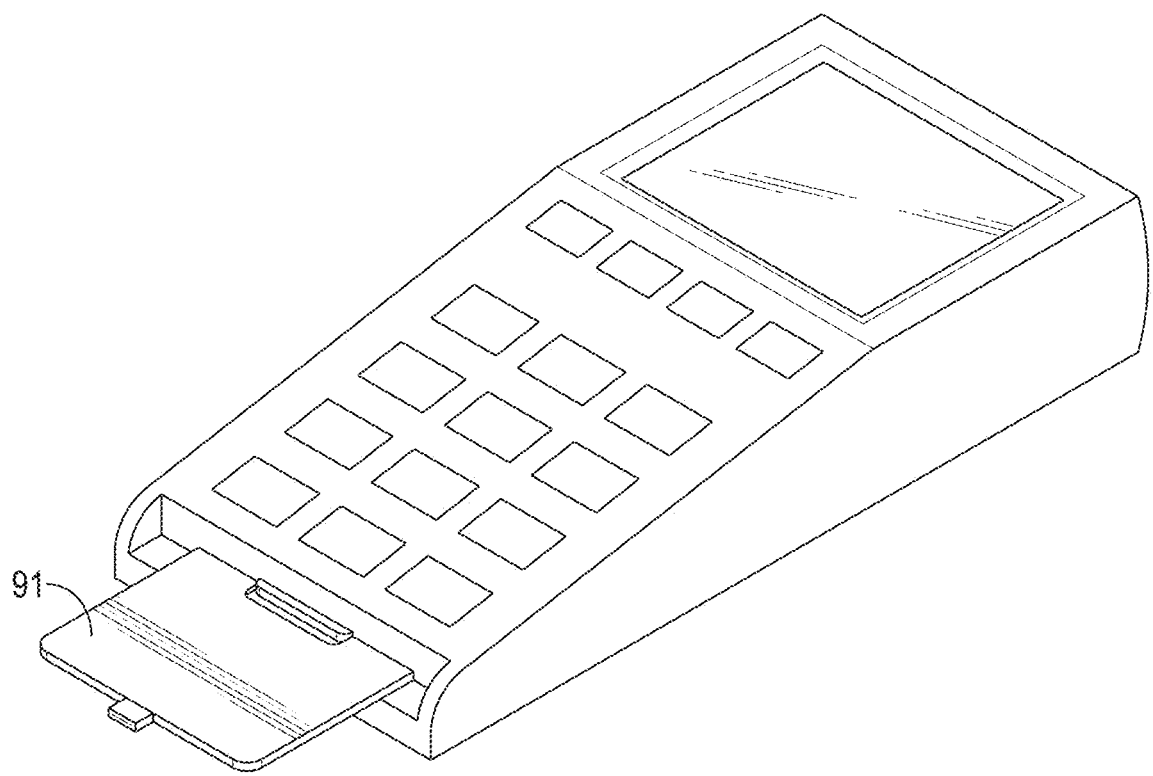
FIG. 9 depicts an example of a payment processing machine with an optically scannable payment card inserted.
Figure 10:
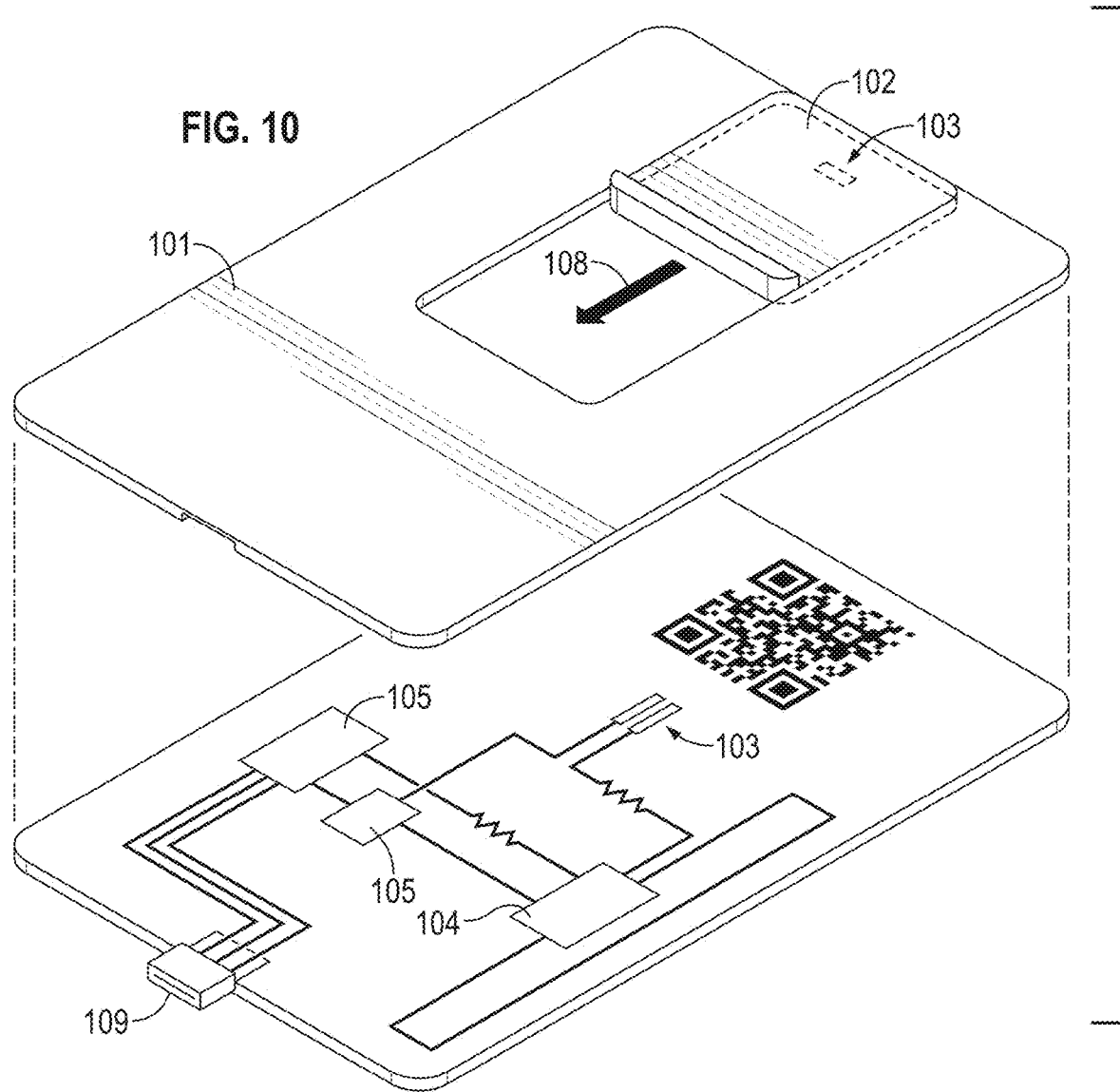
FIG. 10 depicts the preferred embodiment where the radio transceiving payment card is electronically connected to the card holder user's mobile device which provides a temporary user interface while the card is inserted into the payment processing machine, being simultaneously connected to the card holder user's mobile device and the payment processing machine, while the electronic payment is being conducted.
Figure 11:
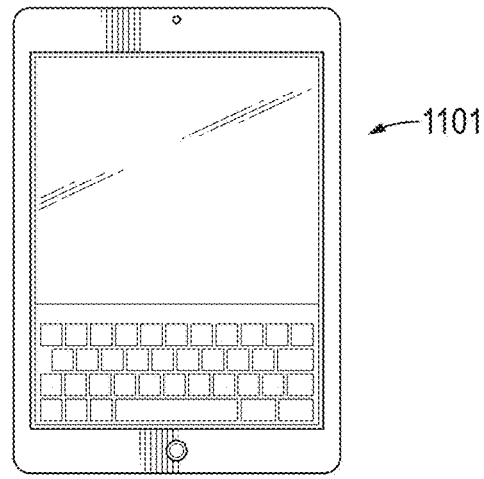
FIG. 11 depicts the card holder user's mobile device.
Figure 12:
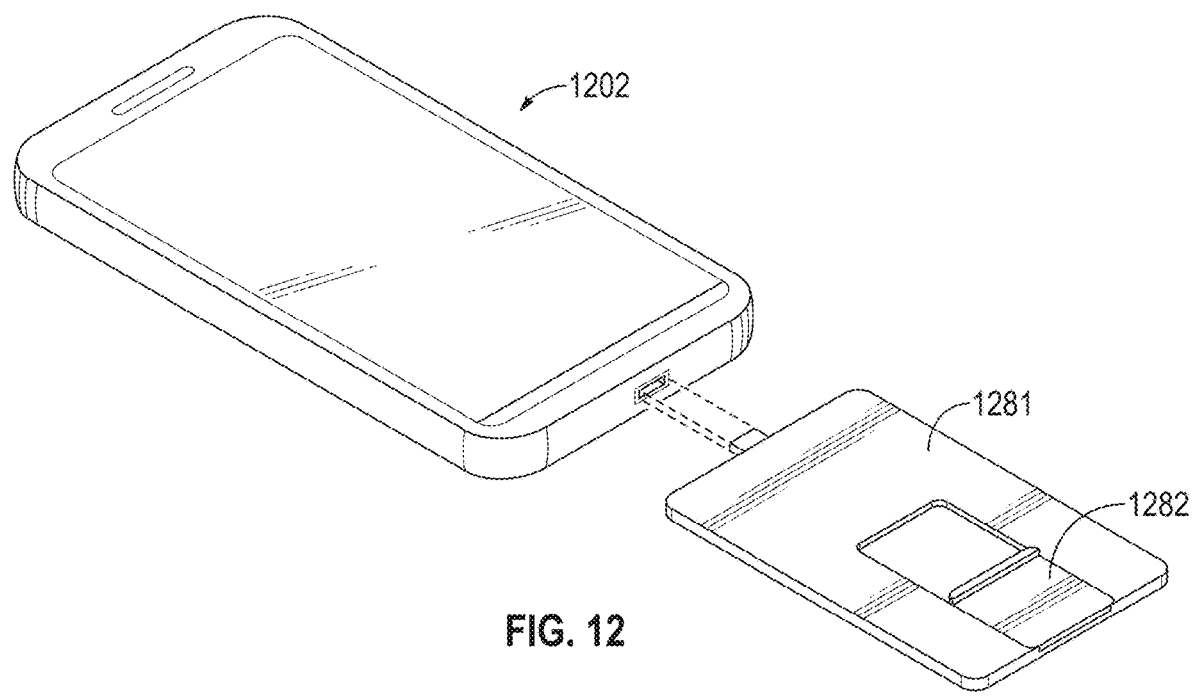
FIG. 12 depicts an embodiment of the invention showing insertion of a card with micro-USB dongle into a mobile device in isometric view.
Figure 13:
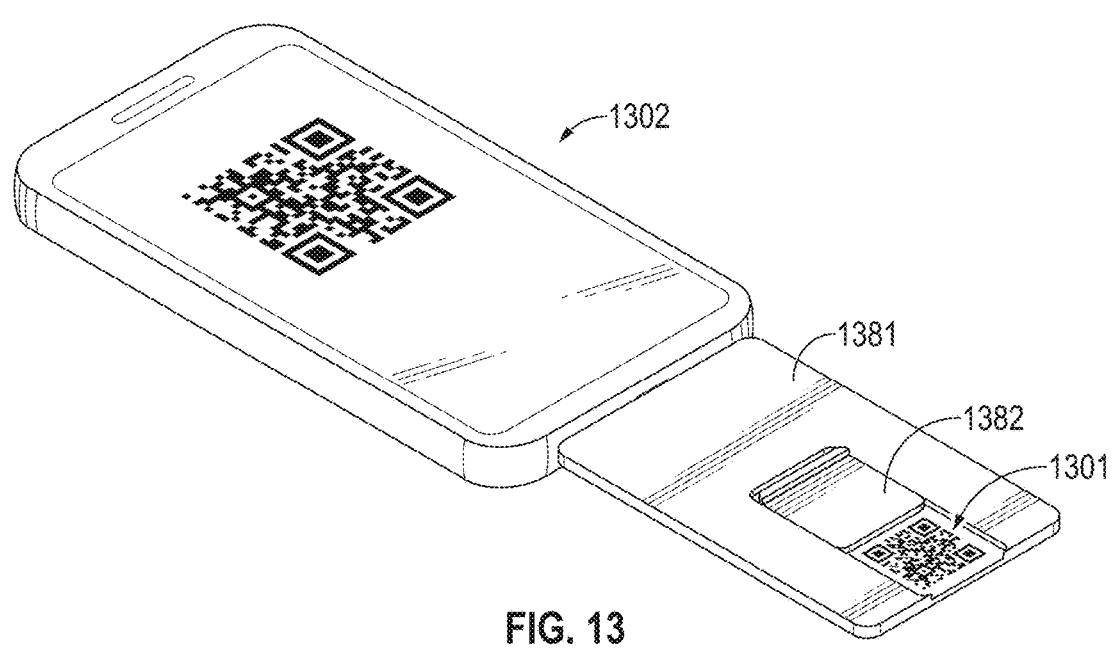
FIG. 13 depicts the embodiment shown in FIG. 12 after insertion.

Card 81, preferably rectangular, displaying a scannable "key" code as depicted in FIGS. 8A, 8B and 10 with an opaque privacy slide 82 that prevents viewing the scannable code when closed (FIG. 8A) but allows viewing the scannable "key" code 83 when in the slid open position;

Opening the privacy slide actuates an electromechanical switch 103, 103' (switch closes to complete circuit as illustrated) when the privacy slide is in the open position. See FIG. 10.

Closing of the switch energizes and activates radio transceiver 104 exampled by Bluetooth or WiFi.

And Simultaneously Activates an EPROM microchip or CPU 105 connected to RAM/Flash memory 105' sufficient to run a computer software program.

To connect with a payment terminal such as an ATM, card reader or functional equivalent 91 (see FIG. 9) and transmit card holder/user identity data;

And in the Preferred Embodiment connect to a Card Holder User's Laptop, Cell Phone, Tablet 1101 or functionally equivalent device to allow the card holder/user to input data such as PIN code, amount of purchase, tip preference, cash back and the like;

With the activation feature functionality of the radio transceiver being electronically enabled only when the opaque slide is in the open position (see arrow 108);

And in the Preferred Embodiment containing a USB, micro-USB or functionally equivalent electronic hardware port 109, (see FIG. 10) with the radio transceiver being deactivated with respect to a payment terminal device or device when used as a payment device by the BUYER except to allow uploading of software programming instructions, as well as, loading card holder/user data, including but not limited to multiple payment card identities such as VISA, DISCOVER, CHASE, Bank of America, or functional equivalent;

With the software only functioning when the payment terminal has read the scannable code while the privacy slide is open, decrypting the code, and providing the proper software unlock code to allow the mechanism to function.

NARRATIVE: User takes out the card and inserts it into the payment terminal slot. The privacy slide is opened, and the payment terminal reads the scannable code. The scannable code is decrypted, and the radio transceiver, flash drive, and EPROM are activated so that the payment terminal can read the payment card information.

Simultaneously, the transceiver communicates with the card holder user's mobile device to display information relevant to making an payment such as a list of available payment cards, a PIN display interface, a dialog box to allow input of the payment amount or a tip, or a notation of the purpose of the payment, without the need for the user to touch any part of the payment terminal such as a keypad, or public screen, with all input and output being handled through the user's mobile device.

The "card" contains a data port to allow hardware only communications for purposes of programming the card or when more secure communications without radio transmissions are desired. In this configuration, the payment card would be plugged into the Card Holder User's mobile device mini-USB port before being inserted into the payment processing machine, and all communications would be by "hardwire" without using radio frequencies.

The depiction presented should be considered the preferred embodiment in that at the most basic level the invention could be depicted as a card that displays a scannable code as the privacy slide is opened when the payment card is inserted into a payment terminal, with the scannable code being linked to the card holder user's identity data as depicted in FIG. 8B. When depicted in the most basic way, the embodied invention would rely on the software from the payment processor to link that card holder user's identity to the scannable code. Obvious improvements, such as including a spring to close the privacy slide when the card is removed from the payment terminal slot have been omitted from the specification, in the interest of efficient expression of the embodiment, but should be considered an implicit part of the invention.

As an alternative embodiment to expressing the scannable code via a "card", the card could be replaced by a wearable electronic device that employs a display such as depicted via a "smart-watch", whereby the scannable code is electronically opaqued out unless a payment is about to be made. Due to limitations of electronic "hacking", this embodiment would not be considered a preferred embodiment over the card, however.

Seller Configuration

Seller Inserts the MicroUSB Dongle into the Seller's Laptop, Cell Phone, Tablet or functionally equivalent device to allow the Seller to receive an electronic payment from the BUYER.

The Insertion of the MicroUSB Dongle allows the device to be put into a mode receive payments e.g. a payment processing terminal. The Seller retracts the Opaque Privacy Slide to allow the BUYER's mobile device to view, scan and capture the image containing the image containing the SELLER'S scannable "key" code. This switches the payment RECEIVE function on while the Micro USB is inserted into the Seller's device.

For extra security a 2' contact switch might be used such that the USB dongle can slide into or out of the device for additional feature configurations.

In the Preferred Embodiment, the insertion of the MicroUSB dongle into the SELLER's device energizes and activates software to connect the SELLER'S device via radiofrequency such as Bluetooth or WiFi which is further connected to the SELLER'S financial institution or even directly to the BUYER'S device to allow a direct transfer of data payment string such as a hashed BITCOIN value.

Insertion simultaneously activates an EPROM microchip or CPU connected to RAM/Flash memory sufficient to run a computer software program to facilitate a wireless payment and to physically connect to the Seller's device which then employs software such that the Seller's device functions as a payment terminal whereby the BUYER reads the scannable code displayed by the SELLER while the privacy slide is open, decrypts the SELLER's scannable code, which provides the Seller Identity information to the BUYER as detailed in previous embodiments sufficient to facilitate a payment from Buyer to Seller.

In the Preferred Embodiment the invention when embodied as a payment terminal simultaneously connects, either directly or through the Seller's mobile device, to a BUYER's Laptop, Cell Phone, Tablet or functionally equivalent device to allow the BUYER to input data such as PIN code, amount of purchase, tip preference, cash back and the like without the need to physically touch any of the SELLER's physical hardware, such as PIN input keys, or the like.

With the payment terminal software preferably only functioning to receive a payment while the MicroUSB port dongle is inserted into the SELLER'S device, and while the privacy slide is retracted for the BUYER to scan the image containing the Seller's scannable code. As an enhancement, the scannable code displayed when the privacy slide is retracted may also be electronically displayed on the SELLER's mobile device in case the analog display beneath the privacy slide is damaged.

What is claimed is:

1. A method for making a purchase at a point of sale, said method comprising
    inserting a buyer's payment card device into a seller's payment terminal at the point of sale,
    said buyer's payment card device including a computer memory that is received by the seller's payment terminal,
    said buyer's payment card device including a radio transceiver for communicating with a buyer mobile communication device,
    said seller providing an optical bar code encoding seller payment information that becomes readable to a buyer's mobile communication device upon retraction of a slider carried by the buyer's payment card device,
    reading the seller optical bar code encoding the seller payment information with the buyer's mobile communication device,
    decrypting the seller payment information with the buyer's mobile communication device,
    communicating data between a buyer's mobile communication device and the seller's payment terminal via the radio transceiver to consummate the purchase.

2. A method as in claim 1 further comprising communicating data between the buyer's mobile communication device and a financial institution to effect payment without revealing buyer financial information to seller.

3. A method as in claim 2 further comprising communicating data between the buyer's mobile communication device and a financial institution to effect payment without revealing buyer identity information to seller.

4. A method for making a purchase at a point of sale, said method comprising
    inserting a buyer's payment card device into a seller's payment terminal at the point of sale,
    said buyer's payment card device including a computer memory that is received by the seller's payment terminal,
    said buyer's payment card device including a radio transceiver for communicating with a buyer mobile communication device,
    said buyer's mobile communication device having a micro-USB port,
    said buyer's payment card device including a dongle for insertion into the micro-USB port of the buyer's mobile communication device,
    said seller providing an optical bar code encoding seller payment information that becomes readable to a buyer's mobile communication device upon insertion of the payment card device dongle into the micro-USB port of the buyer's mobile communication device,
    reading the seller optical bar code encoding the seller payment information with the buyer's mobile communication device,
    decrypting the seller payment information with the buyer's mobile communication device,
    communicating data between a buyer's mobile communication device and the seller's payment terminal via the radio transceiver to consummate the purchase.

5. A method as in claim 4 further comprising communicating data between the buyer's mobile communication device and a financial institution to effect payment without revealing buyer financial information to seller.

6. A method as in claim 4 further comprising communicating data between the buyer's mobile communication device and a financial institution to effect payment without revealing buyer identity information to seller.

\* \* \* \* \*